(12) United States Patent
Willemsen

(10) Patent No.: US 6,918,318 B2
(45) Date of Patent: Jul. 19, 2005

(54) BRAKE PEDAL ASSEMBLY WITH VARIABLE RATIO

(75) Inventor: Larry G. Willemsen, Morpeth (CA)

(73) Assignee: KSR Industrial Corporation, Southfield, MI (US)

( * ) Notice: Subject to any disclaimer, the term of this patent is extended or adjusted under 35 U.S.C. 154(b) by 119 days.

(21) Appl. No.: 10/204,725
(22) PCT Filed: Jan. 10, 2002
(86) PCT No.: PCT/US02/00794
§ 371 (c)(1), (2), (4) Date: Aug. 22, 2002
(87) PCT Pub. No.: WO02/055353
PCT Pub. Date: Jul. 18, 2002

(65) Prior Publication Data
US 2003/0106392 A1 Jun. 12, 2003

Related U.S. Application Data
(60) Provisional application No. 60/260,716, filed on Jan. 10, 2001.

(51) Int. Cl.$^7$ .................................................. G05G 1/14
(52) U.S. Cl. ................................... 74/560; 74/512
(58) Field of Search ........................... 74/512, 513, 560

(56) References Cited

U.S. PATENT DOCUMENTS

| | | | | |
|---|---|---|---|---|
| 3,025,713 A | * | 3/1962 | Koshaba et al. ............... | 74/478 |
| 3,382,676 A | | 5/1968 | Tenniswood ................. | 60/54.6 |
| 3,563,111 A | | 2/1971 | Zeigler ......................... | 74/512 |
| 3,646,831 A | | 3/1972 | Janosi ........................... | 74/518 |
| 3,678,779 A | | 7/1972 | Janosi ........................... | 74/516 |
| 3,911,760 A | | 10/1975 | Elbers et al. .................. | 74/512 |
| 4,069,722 A | | 1/1978 | Derrick ......................... | 74/516 |

(Continued)

FOREIGN PATENT DOCUMENTS

| | | |
|---|---|---|
| FR | 95 12130 | 4/1997 |
| JP | 51-40582 | 4/1976 |
| JP | 56-86853 | 7/1981 |

(Continued)

OTHER PUBLICATIONS

'74 General Motors Service Manual 5–10:5–17.
Brake System with Double Link–Type Variable Ratio Brake Pedal, Brake Technology: ABS/TCS Systems, NVH and Foundation Brakes (SP–1537), Naoki Yabusaki, Hidetoshi Shimizu, Shigeru Sakamoto and Hiroshi Isono, SAE 2000 World Contresst, Mar. 6, 2000.

*Primary Examiner*—David A. Bucci
*Assistant Examiner*—Bradley J. Van Pelt
(74) *Attorney, Agent, or Firm*—Gifford, Krass, Groh, Sprinkle, Anderson & Citkowski, P.C.

(57) ABSTRACT

A variable ratio brake pedal assembly includes a support bracket having a mounting face and two spaced apart side arms extending from opposing edges of the mounting face. The brake pedal assembly also includes a pedal arm pivotally mounted to the support bracket at a first pivot point, and having a pedal pad mounted to a lower end of the pedal arm. The brake pedal assembly also includes a pedal link having a first end and a second end, such that the first end is pivotally connected to the pedal arm at a third pivot point, and a brake booster link having a first end and a second end, and the first end of the brake booster link is pivotally mounted to the second end of the pedal link at a fourth pivot point and the second end of said brake booster link is pivotally mounted to the support bracket at a second pivot point. The brake pedal assembly further includes a brake booster rod attaching means located on the brake booster link at a fifth pivot point, such that the fifth pivot point is located on the brake booster link so that a distance between the second pivot point and the fifth pivot point is less than a distance between the second pivot point and the fourth pivot point.

19 Claims, 3 Drawing Sheets

U.S. PATENT DOCUMENTS

| | | | |
|---|---|---|---|
| 4,372,178 A | * 2/1983 | Ota | 74/512 |
| 4,615,235 A | 10/1986 | Horvath | 74/516 |
| 5,771,773 A | 6/1998 | Sakamoto et al. | 91/369.2 |
| 5,848,558 A | * 12/1998 | Isono et al. | 74/512 |
| 5,970,817 A | 10/1999 | Ichiba | 74/512 |
| 6,070,488 A | 6/2000 | Yabusaki et al. | 74/512 |
| 6,076,422 A | 6/2000 | Tabata | 74/412 |
| 6,082,219 A | 7/2000 | Wolpert | 74/512 |
| 6,321,617 B1 | 11/2001 | Schwyn | 74/512 |

FOREIGN PATENT DOCUMENTS

| | | |
|---|---|---|
| JP | 57-109058 | 7/1982 |
| JP | 58-153151 | 9/1983 |
| JP | 58-221757 | 12/1983 |
| JP | 63-48741 | 3/1988 |
| JP | 64-87069 | 3/1989 |
| JP | 2-200579 | 8/1990 |
| JP | 4-35962 | 2/1992 |
| JP | 4-40319 | 2/1992 |
| JP | 4-215558 | 8/1992 |
| JP | 5-58271 | 3/1993 |
| JP | 5-185912 | 7/1993 |
| JP | 6-211115 | 8/1994 |

* cited by examiner

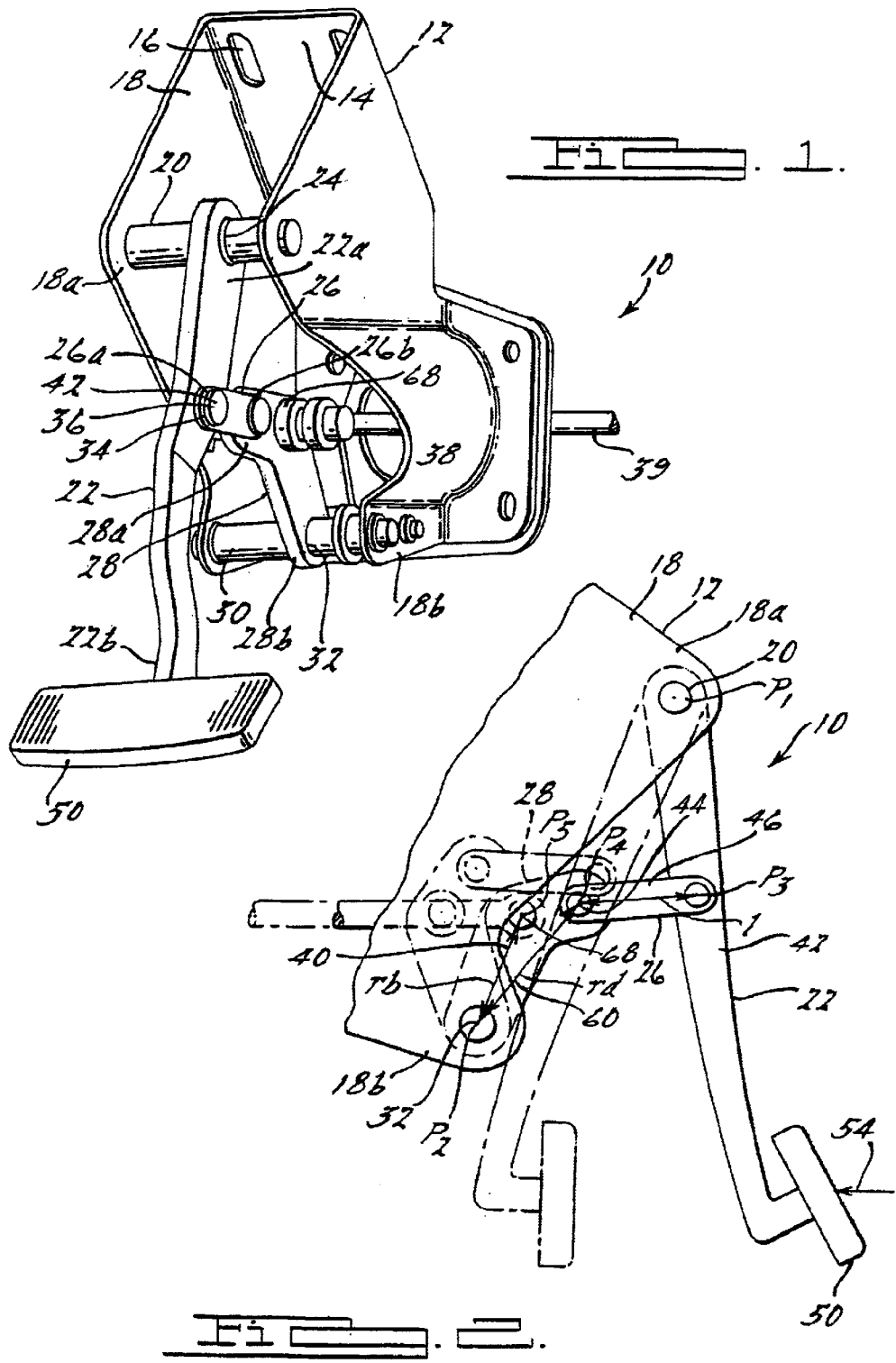

BRAKE PEDAL ASSEMBLY WITH VARIABLE RATIO

This application claims the benefit of Provisional Application No. 60/260,716, filed Jan. 10, 2001.

BACKGROUND OF THE INVENTION

The present invention relates generally to brake pedals, and more specifically, to a brake pedal assembly with a variable ratio linkage.

Vehicles, and in particular automotive vehicles, include a brake system for controlling the movement of the vehicle. Conventional brake systems include a brake pedal for transmitting a braking force from the vehicle operator to the wheels of the vehicle. The brake pedal is operatively coupled to a brake booster via a push rod. The brake booster is operatively connected to a master cylinder, and the master cylinder is operatively connected to a braking mechanism via brake lines. The braking mechanism is coupled to a wheel of the vehicle and applies the force to the wheel to slow down the rotational movement of the wheel.

Various factors influence the overall efficiency of the brake system. Examples of some of these factors include the size of the brake booster, the master cylinder diameter and radius of the tires, the brake pad material and the pedal lever ratio. At the same time, the brake system must comply with regulatory requirements regarding braking distance and the amount of force required to slow down the vehicle.

Pedal lever ratio refers to the geometric relationship between the levers that make up the brake pedal assembly. A typical brake pedal assembly includes a pedal arm, and an upper end of the pedal arm is pivotally mounted to a support bracket. The support bracket is fixedly mounted to the vehicle. A pedal pad is mounted to a lower end of the pedal arm for depression by the driver's foot. The brake booster push rod is attached to the pedal arm at a location between the pedal pad and the pivot point at the upper end of the pedal arm. The feel and effectiveness of the braking action experienced by the operator can be varied by changing the "pedal ratio". The "pedal ratio" is expressible as a ratio a/b, where "a" is the distance between the pivot point for the pedal arm and the actuation point on the pedal pad, and "b" is the distance between the pivot point and the booster rod attachment point. In general, the lower the value of the pedal ratio, the greater the distance the brake rod pivot point and booster push rod travel, relative to the distance traveled by the pedal pad. A high pedal ratio can be effective, but the long pedal travel results in a "spongy" feel to the brakes. Conversely, a low pedal ratio is the result of a shorter pedal travel, however, the shorter pedal travel results in an abrupt or sharp braking action.

Various types of variable ratio brake pedals are known in the art. For example, U.S. Pat. No. 4,615,235 to Horvath dated Oct. 7, 1986 discloses a variable ratio brake pedal system. This system includes a first lever pivotally mounted on an arcuately movable pedal arm. One end of the first lever is attached to the brake booster push rod. The other end of the first lever is pivotally attached to a pivot control lever. The pivot control lever is fixedly attached at the other end. An upper end of the pedal arm is fixedly attached to a portion of the vehicle. Thus, actuation of the brake pedal increases the pedal ratio relative to the travel of the brake pedal, by a factor of about two. While this system works, the large angular displacement at the second pivot point, between the brake booster rod and the first lever, may result in excessive stress on the brake booster rod.

Another example of a variable brake pedal assembly is disclosed in U.S. Pat. No. 6,070,488 to Yabusaki et al., dated Jun. 6, 2000. This system includes a suspended pedal attached to a pedal bracket having a main bracket and a sub-bracket. A V-shaped swing link connects the brake pedal and a push rod. If a predetermined external force is applied to the front of the vehicle, an extending portion of the sub-bracket is pressed by the main bracket and swings rearward of the vehicle and a clevis at the end of the push rod is forced in toward the front side of the vehicle by a front surface of the extending portion of the sub-bracket. The brake pedal swings around the mounting bolt toward the front side of the vehicle via the swing link, and the link and the pedal pad is displaced towards the front side of the vehicle. The movement of the pedal pad towards the front side of the vehicle protects the driver's legs from contacting a portion of the vehicle, such as the steering column. While this system works in counteracting the effect of an external force applied to the front of the vehicle with respect to the pedal, it does not vary the pedal ratio under typical driving conditions.

In larger vehicles, such as SUVs, more force is required to control the movement of the vehicle, and a higher pedal ratio may be required, especially at the beginning of the braking action. The displacement of the brake pedal from an initial, resting position to a fully depressed portion is referred to as pedal stroke. Thus, there is a need in the art for a brake pedal assembly in which the relative position of the brake rod attachment point changes with respect to the pivot position of the pedal arm, to provide a pedal ratio multiplier or variable pedal ratio that increases during the stroke of the brake pedal.

SUMMARY OF THE INVENTION

Accordingly, the present invention is a variable ratio brake pedal assembly. The variable ratio brake pedal assembly includes a support bracket having a mounting face and two spaced apart side arms extending from opposing edges of the mounting face. The brake pedal assembly also includes a pedal arm pivotally mounted to the support bracket at a first pivot point, and having a pedal pad mounted to a lower end of the pedal arm. The brake pedal assembly also includes a pedal link having a first end and a second end, such that the first end is pivotally connected to the pedal arm at a third pivot point, and a brake booster link having a first end and a second end, and the first end of the brake booster link is pivotally mounted to the second end of the pedal link at a fourth pivot point and the second end of said brake booster link is pivotally mounted to the support bracket at a second pivot point. The brake pedal assembly further includes a booster rod attaching means for attaching a brake booster rod to the brake booster link located at a fifth pivot point, such that a distance between the second pivot point and the fifth pivot point is less than a distance between the second pivot point and the fourth pivot point.

One advantage of the present invention is that a variable ratio brake pedal assembly is provided that improves brake effectiveness. Another advantage of the present invention is that a variable ratio brake pedal assembly is provided that varies the pedal ratio during the pedal stroke to improve brake feel throughout the pedal stroke. A further advantage of the present invention is that the master cylinder and brake booster size are optimized with respect to the pedal ratio. Still a further advantage of the present invention is that the relationship between pedal stroke and pedal ratio represents a convex curve.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a variable ratio brake pedal assembly, according to the present invention.

FIG. 2 is a side view of the variable ratio brake pedal assembly of FIG. 1, according to the present invention.

DESCRIPTION OF THE INVENTION

Figure 3:
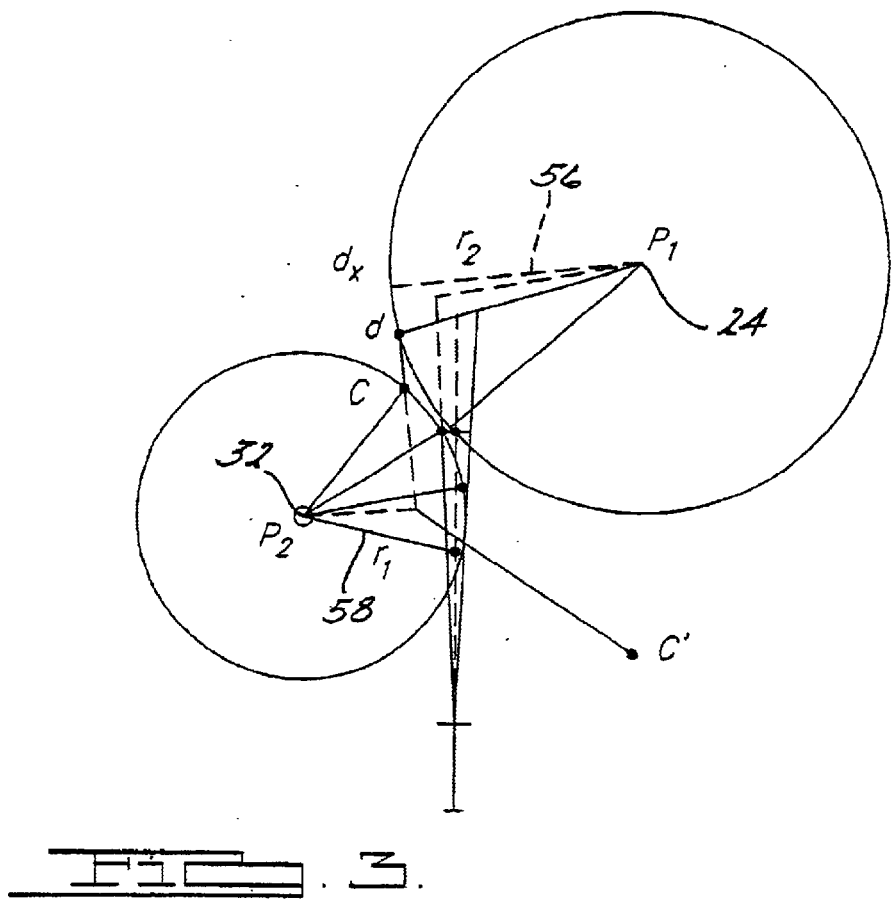
FIG. 3 is a schematic view geometrically illustrating pedal ratio for the variable ratio brake pedal assembly of FIG. 1, according to the present invention.

Referring to FIGS. 1–6, a variable ratio brake pedal assembly 10 for translating a signal between a vehicle operator or driver (not shown) and a brake actuating mechanism (not shown) is illustrated. As is known in the art, the brake pedal assembly is part of the brake system for slowing down the vehicle. In a fixed brake pedal assembly, the height of the pedal pad (to be described) with respect to the floor is a predetermined height. In an adjustable brake pedal assembly, the initial position of the pedal pad relative to a portion of the vehicle, such as the floor, is adjustable by the driver. It should be appreciated that in this example, the brake pedal assembly 10 is a fixed height brake pedal assembly, although an adjustable height brake pedal assembly is contemplated. An example of an adjustable height brake pedal assembly is disclosed in commonly assigned U.S. patent application Ser. No. 09/882,981, which is incorporated herein by reference.

The variable ratio brake pedal assembly 10 is fixedly mounted to a dash panel portion of the vehicle in a conventional position beneath the instrument panel. The brake pedal assembly 10 includes a support bracket 12 for attaching the brake pedal assembly 10 to the dash panel. The support bracket 12 includes a generally planar mounting face 14 having apertures 16 for attaching the support bracket 12 to the vehicle, such as by bolting. The support bracket also includes two spaced apart sides 18 extending radially from opposing edges of the mounting face 14. Each of the sides 18 forms an upper arm 18a and a lower arm 18b.

The variable pedal ratio brake pedal assembly 10 includes a pivot pin 20 extending therebetween the upper side arms 18a. The pivot pin 20 pivotally supports a pedal arm 22, and in particular an upper end 22a of the pedal arm 22, about a pivot axis $P_1$ shown at 24. Preferably, the brake pedal assembly 10 includes a torsion spring (not shown) operatively disposed on the pivot pin 20 for controlling the movement of the brake pedal assembly 10 between a resting and braking position, as is known in the art.

The variable pedal ratio brake pedal assembly 10 further includes a pair of pivotally interconnected links, a pedal link 26 and a brake rod booster link 28, respectively. The pedal link 26 is a generally planar member. A first end 26a of the pedal link 26 is pivotally connected to the pedal arm 22 and a second end 26b of the pedal link 26 is pivotally connected to a first end 28a of the brake rod booster link 28. It should be appreciated that in this example, there are two pedal links 26, with each positioned on either side of the pedal arm 22. Advantageously, the use of two pedal links 26 better distributes the load transferred to the brake rod booster link 28 from the pedal arm 22.

The brake rod booster link 28 is a generally planar member. In this example the brake rod booster link 28 has a general "V" shape, with a first end 28a and a second end 28b. The second end 28b of the booster link 28 is pivotally mounted to the lower side arms 18b of the support bracket 12 using a booster link pivot pin 30, enabling the brake rod booster link 28 to pivot about a fixed second pivot axis $P_2$, as shown at 32. Preferably, the first end 28a of the brake rod booster link 28 has an aperture 34 for receiving a link pin 36, for pivotally connecting the pedal link 26 to the brake rod booster link 28.

The brake rod booster link further includes a brake booster rod attaching means 38 mounted on the booster rod link 28. In this example the attaching means 38 is a pin, although other types of attaching means are contemplated, such as a ball joint. It should be appreciated that one end of the brake booster rod 39 is operatively attached to attaching means 38 and another end is operatively attached to the brake booster, as is known in the art, and transmits the force of the operator applying the brakes from the brake pedal assembly 10 to the braking system. The attaching means 38 is positioned on the booster rod link 28 at a fifth pivot point $P_5$, shown at 68. The distance between the second pivot point $P_2$ 32 and the fifth pivot point $P_5$ is referred to as $r_b$, as shown at 40. The first end 26a of the pedal link 26 is pivotally connected to the pedal arm 22 at pivot point $P_3$, as shown at 42 and the second end 26b of the pedal link 26 is pivotally connected to the booster rod booster link 28 at pivot point $P_4$, as shown at 44. The distance between the second pivot point $P_2$ 32 and the fourth pivot point $P_4$ 44 is referred to as $r_d$, as shown at 60. The pivot points $P_3$ and $P_4$ 42, 44 define a pedal link axis, referred to as L, as shown at 46.

It should be appreciated that the brake pedal assembly 10 includes other components as is known in the art. For example, the brake pedal assembly 10 may include a stop (not shown) extending therebetween the side aims 18 of the support bracket 12 over the pivot pin 20, to position the links 26, 28 when the pedal arm 22 is in a resting position. The variable ratio brake pedal assembly 10 further includes a pedal pad 50 mounted to a lower end 22b of the pedal arm 22. The pedal pad 50 provides a pedal actuation point shown at 54 where the foot of the driver contacts the pedal pad 50.

Figure 4:
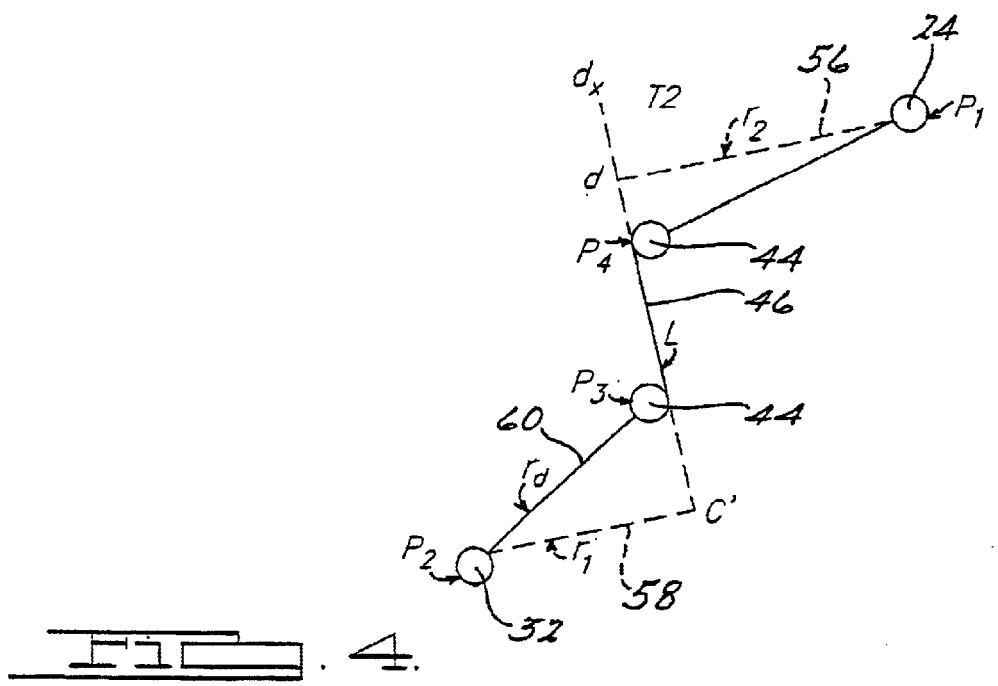
FIG. 4 is a schematic view illustrating the geometric relationship between the pedal lever and the brake booster lever for the variable ratio brake pedal assembly of FIG. 1, according to the present invention.
Figure 5:
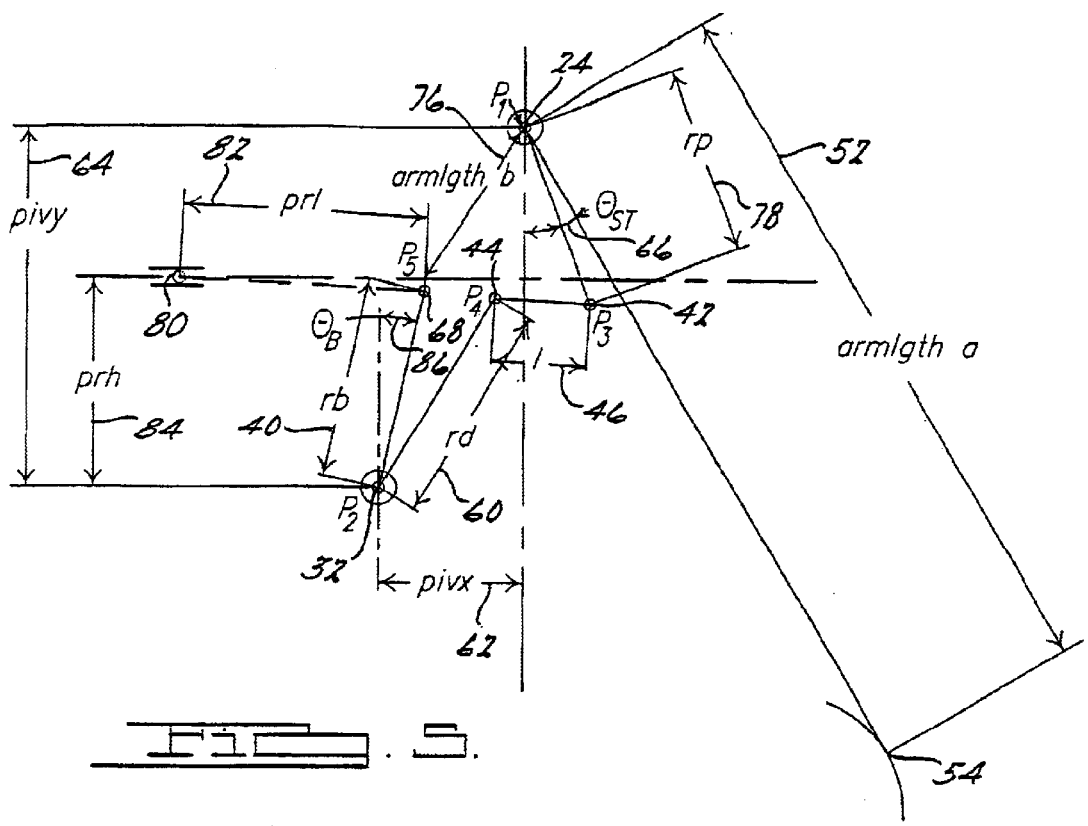
FIG. 5 is a diagrammatic view illustrating the geometric relationship between the pedal lever and brake booster lever for the variable ratio brake pedal assembly of FIG. 1, according to the present invention.

Referring to FIGS. 3–5, the pedal ratio is defined as the ratio of the arm length "a" 52 between the first pivot point $P_1$ 24 and the actuation point on the pad 54 and the arm length "b" 76 between the first pivot point $P_1$ 24 and the fifth pivot point $P_5$ 68. The pedal ratio for a fixed relationship between levers is expressed as R=(a/b). However, for a variable relationship, the variable ratio is expressed as R=(a/b)*($r_1/r_2$), where ($r_1/r_2$) is a ratio multiplier. It should be appreciated that the ratio multiplier is a fixed constant. As shown in FIG. 4, $r_2$ refers to the perpendicular length from the first pivot $P_1$ 24 to the pedal link axis L 46 as shown at 56, and $r_1$ refers to the perpendicular length from the pivot $P_2$ 32 to the pedal link axis L 46 as shown at 58. As previously described, pedal link axis L 46 extends longitudinally through the pivot points $P_3$ and $P_4$ 42, 44 of the pedal link 26.

It should be appreciated that in order to maintain the ratio multiplier effect, the distance $r_b$ 40 is less than the distance $r_d$ 60. That is, the distance from the second pivot point $P_2$ 32 to the fifth pivot point $P_5$ 68 is less than the distance between the second pivot point $P_2$ 32 and the fourth pivot point $P_4$ 44.

As also shown in FIG. 5, the horizontal distance between the first pivot point $P_1$ 24 and second pivot point $P_2$ 32 is PIVX, as shown at 62 and the distance on the horizontal axis between $P_2$ 32 and $P_1$ 24 is PIVY as shown at 64. The angle between a vertical axis and $r_p$ when the arm is not depressed is $\theta_{ST}$ as shown at 66, where $r_p$ is the distance between the first pivot point $P_1$ 24 and the third pivot point $P_3$ 42, as shown in 78. Similarly, the horizontal distance between the fifth pivot $P_5$ 68 and the brake booster, shown at 80, is the brake booster axis, or PRL, as shown at 82. The vertical distance or PRH between the second pivot point 32 and brake booster 80 is shown at 84. The angular displacement of the second pivot point $P_2$ 32 is referred to as $\theta_B$, as shown at 86. It should be appreciated that these dimensions are selected to obtain the desired operational feel of the brake pedal system.

Figure 6:
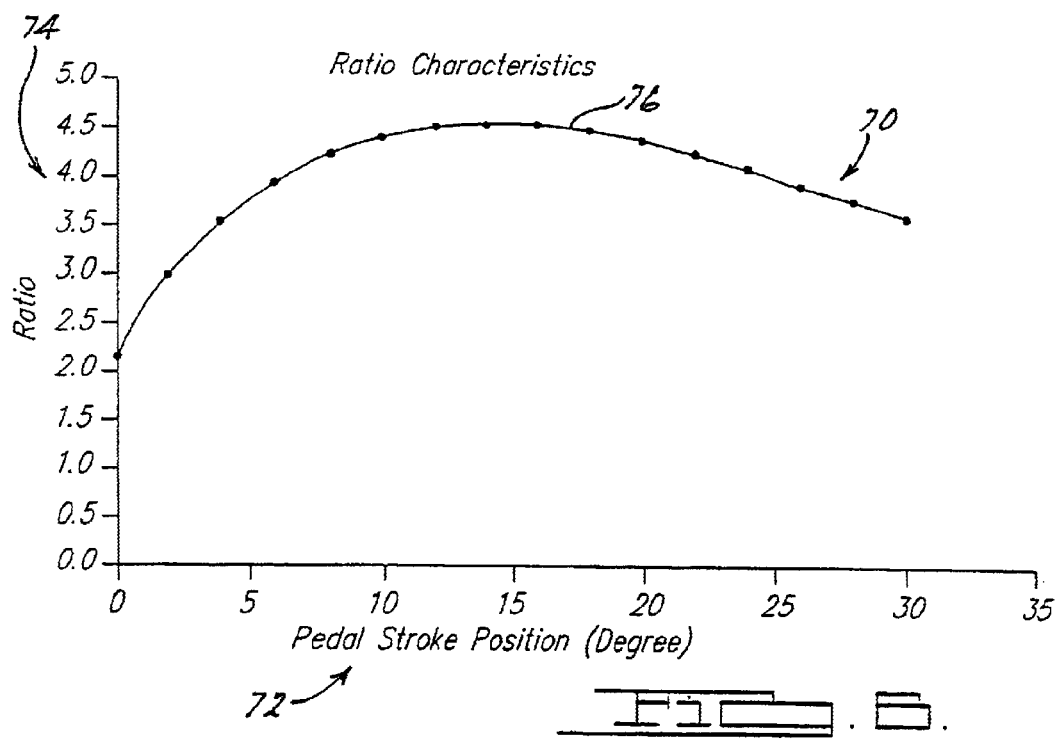
FIG. 6 is a graph illustrating pedal ratio with respect to pedal stroke for the variable ratio brake pedal assembly of FIG. 1, according to the present invention.

In operation, as the driver depresses the pedal pad 50, the second end 26b of the pedal link 26 rotates in a clockwise direction about the fourth pivot point $P_4$ 44. At the same time, the second end 28b of the brake rod booster link 28 rotates in a counterclockwise direction about the fixed second pivot point $P_2$ 32, such that the pedal link 26 folds into the brake rod booster link 28. The relative position of the booster rod pivot point $P_5$ is effectively varied with respect to the first pivot point $P_1$ 24 of the pedal arm 22, thereby varying the "brake ratio". As illustrated in FIG. 6 at 70, the effect of varying the pedal ratio 74 on pedal feel is shown graphically. The pedal pad position, referred to as pedal stroke, and measured in degrees, is the x-axis 72. The pedal ratio is the y-axis 74. Thus, as shown by the convex curve at 76, the pedal ratio initially increases at a predetermined rate, reaches a constant rate, and decreases at another predetermined rate, as the pedal stroke travels between an initial position and a fully depressed position. An increasing brake ratio is provided when $r_b$ is less than $r_d$. For example, the pedal ratio increases at a high rate from the beginning of the stroke to approximately 15°, and the pedal ratio increases from approximately 2.2 to 4.6, is constant, and thereafter, the pedal ratio decreases at another, slower rate. Advantageously, the convex shape of the pedal ratio curve 76 provides for good pedal feel and brake effectiveness throughout the pedal stroke.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A variable ratio brake pedal assembly for varying the pedal ratio during a pedal stroke comprising:

a support bracket having a mounting face and two spaced apart side arms extending from opposing edges of said mounting face;

a pedal arm, wherein an upper end of said pedal arm is pivotally mounted to said support bracket at a first pivot point and a pedal pad is mounted to a lower end of said pedal arm;

a pedal link having a first end and a second end, wherein said first end is pivotally connected to said pedal arm at a third pivot point;

a brake booster link having a first end and a second end, wherein said first end of said brake booster link is pivotally mounted to said second end of said pedal link at a fourth pivot point and said second end of said brake booster link is pivotally mounted to said support bracket at a second pivot point; and a brake booster rod attaching means located on the brake booster link at a fifth pivot point, wherein said fifth pivot point is located on said brake booster link between said second pivot point and said fourth pivot point, and a first distance between said second pivot point and said fifth pivot point is less than a second distance between said second pivot point and said fourth pivot point such that the pedal ratio varies nonlinearly during the pedal stroke.

2. A variable ratio brake pedal assembly as set forth in claim 1 wherein said side arm includes an upper arm and a lower arm, and said pedal arm is pivotally attached to said upper side arm at said first pivot point.

3. A variable ratio brake pedal assembly as set forth in claim 2 wherein said brake booster link is pivotally attached to said lower side arm at said second pivot point.

4. A variable ratio brake pedal assembly as set forth in claim 1 further comprising two pedal links and said pedal arm is disposed between said first ends of said pedal links.

5. A variable ratio brake pedal assembly as set forth in claim 1, wherein said pedal ratio increases at a predetermined first rate, is constant at a predetermined second rate, and decreases at a predetermined third rate over a predetermined during the pedal stroke.

6. A variable brake pedal assembly as set forth in claim 5 wherein said pedal stroke is a distance traveled by the pedal pad between at initial resting position and a fully depressed position.

7. A variable ratio brake pedal assembly as set forth in claim 1 wherein said brake booster link has a generally planar "V" shape.

8. A variable ratio brake pedal assembly as set forth in claim 1 wherein said pedal link is a generally planar member.

9. A brake pedal assembly having a variable pedal ratio for varying the pedal ratio during a pedal stroke comprising:

a support bracket having a mounting face and two spaced apart side arms extending from opposing edges of said mounting face wherein each of side arms includes an upper arm and a lower arm;

a pedal arm, wherein an upper end of said pedal arm is pivotally mounted between said upper side arms at a first pivot point and a pedal pad is mounted to a lower end of said pedal arm;

a pedal link having a first end and a second end, wherein said first end is pivotally connected to said pedal arm at a third pivot point;

a brake booster link having a first end and a second end, wherein said first end of said brake booster link is pivotally mounted to said second end of said pedal link at a fourth pivot point and said second end of said brake booster link is pivotally mounted to said lower side arm at a second pivot point; and a brake booster rod attaching means located on the brake booster link at a fifth pivot point, wherein said fifth pivot point is located on said brake booster link between said second pivot point and said fourth pivot point, and a first distance between said second pivot point and said fifth pivot point is less than a second distance between said second pivot point and said fourth pivot point such that the pedal ratio varies nonlinearly during the pedal stroke.

10. A variable ratio brake pedal assembly as set forth in claim 9 further comprising two pedal links and said pedal arm is disposed between said first ends of said pedal links.

11. A variable ratio brake pedal assembly as set forth in claim 9 wherein said brake booster link has a generally planar "V" shape.

12. A variable ratio brake pedal assembly as set forth in claim 9 wherein said pedal link is a generally planar member.

13. A variable ratio brake pedal assembly as set forth in claim 9, wherein said pedal ratio increases at a predetermined first rate, is constant at a predetermined second rate, and decreases at a predetermined third rate over a predetermined during the pedal stroke.

14. A variable brake pedal assembly as set forth in claim 9 wherein said pedal stroke is a distance traveled by the pedal pad between at initial resting position and a filly depressed position.

15. A brake pedal assembly having a variable pedal ratio for varying the pedal ratio during a pedal stroke comprising:

a support bracket having a mounting face and two spaced apart side arms extending from opposing edges of said mounting face wherein each of side arms includes an upper arm and a lower arm;

a pedal arm, wherein an upper end of said pedal arm is pivotally mounted between said upper side arms at a first pivot point and a pedal pad is mounted to a lower end of said pedal arm;

a pedal link having a first end and a second end, wherein said first end is pivotally connected to said pedal arm at a third pivot point;

a brake booster link having a first end and a second end, wherein said first end of said brake booster link is pivotally mounted to said second end of said pedal link at a fourth pivot point and said second end of said brake booster link is pivotally mounted to said lower side arm at a second pivot point; and a brake booster rod attaching means located on the brake booster link at a fifth pivot point, wherein said fifth pivot point is located on said brake booster link between said second pivot point and said fourth pivot point, and a first distance between said second pivot point and said fifth pivot point is less than a second distance between said second pivot point and said fourth pivot point, and said pedal ratio increases at a predetermined first rate, is constant at a predetermined second rate, and decreases at a predetermined third rate over a predetermined pedal stroke, such that the pedal ratio varies nonlinearly during the pedal stroke.

16. A variable ratio brake pedal assembly as set forth in claim 15 further comprising two pedal links and said pedal arm is disposed between said first ends of said pedal links.

17. A variable ratio brake pedal assembly as set forth in claim 15 wherein said brake booster link has a generally planar "V" shape.

18. A variable ratio brake pedal assembly as set forth in claim 15 wherein said pedal link is a generally planar member.

19. A variable brake pedal assembly as set forth in claim 15 wherein said pedal stroke is a distance traveled by the pedal pad between at initial resting position and a fully depressed position.

* * * * *